(12) United States Patent
Ernst et al.

(10) Patent No.: US 10,173,849 B2
(45) Date of Patent: Jan. 8, 2019

(54) METHOD AND SYSTEM FOR EXTRACTING ARTICLES

(71) Applicants: Bosch Packaging Technology, Inc., New Richmond, WI (US); Robert Bosch GmbH, Stuttgart (DE)

(72) Inventors: Frank Michael Ernst, Stillwater, MN (US); Alex de Klein, Zoetermeer (NL)

(73) Assignees: Bosch Packaging Technology, Inc., New Richmond, WI (US); Robert Bosch GmbH, Stuttgart, DE (US)

( * ) Notice: Subject to any disclaimer, the term of this patent is extended or adjusted under 35 U.S.C. 154(b) by 0 days.

(21) Appl. No.: 15/422,135

(22) Filed: Feb. 1, 2017

(65) Prior Publication Data
US 2018/0215558 A1    Aug. 2, 2018

(51) Int. Cl.
| B65B 35/26 | (2006.01) |
| B65G 59/06 | (2006.01) |
| B65G 19/02 | (2006.01) |
| B65G 47/06 | (2006.01) |

(52) U.S. Cl.
CPC .......... *B65G 59/067* (2013.01); *B65G 19/02* (2013.01); *B65G 47/06* (2013.01); *B65G 59/068* (2013.01)

(58) Field of Classification Search
CPC ....... B65B 19/10; B65B 23/14; B65G 59/068; B65G 15/44; B65G 47/841; B65H 2301/4352; B65H 39/043; B65H 39/055
See application file for complete search history.

(56) References Cited

U.S. PATENT DOCUMENTS

| 1,886,378 | A | * | 11/1932 | Dearsley | ................. | B65B 35/02 |
| | | | | | | 198/722 |
| 2,597,900 | A | | 5/1952 | Paynter et al. | | |
| 3,117,667 | A | * | 1/1964 | Tichy | ..................... | B65B 19/10 |
| | | | | | | 198/418.3 |
| 3,338,370 | A | | 8/1967 | Maulini | | |
| 3,656,636 | A | * | 4/1972 | Konstantin | .............. | B65G 1/08 |
| | | | | | | 198/348 |
| 3,675,792 | A | * | 7/1972 | Griner | ..................... | B65B 23/14 |
| | | | | | | 414/789.2 |
| 4,181,213 | A | * | 1/1980 | Deutschlander | ....... | B65G 57/32 |
| | | | | | | 198/418.5 |

(Continued)

FOREIGN PATENT DOCUMENTS

| EP | 0868349 | | 2/2000 | | |
| EP | 2172398 A1 | * | 4/2010 | ............. | B65G 57/32 |

(Continued)

OTHER PUBLICATIONS

International Search Report, dated Mar. 28, 2018, corresponding to PCT International Application No. PCT/EP2018/050862, 5 pages.

*Primary Examiner* — Gregory W Adams
(74) *Attorney, Agent, or Firm* — Kathy Takeguchi; Maginot Moore & Beck LLP

(57) ABSTRACT

A magazine extraction system includes a carrier, an extractor, and a catch element. The carrier is disposed below the magazine. The extractor is configured to move an article out of the magazine and along the carrier. The catch element is configured to move the article away from the magazine and along a platform. The extractor is configured to move at a first velocity, which is less than a velocity of the catch element. The extractor is also configured to move at a second velocity, which is greater than the first velocity.

17 Claims, 14 Drawing Sheets

(56) References Cited

U.S. PATENT DOCUMENTS

| | | | |
|---|---|---|---|
| 4,801,036 A * | 1/1989 | Rathert | B65H 39/043 |
| | | | 198/418.3 |
| 4,854,440 A | 8/1989 | Laube et al. | |
| 4,964,501 A * | 10/1990 | Hoffmann | B65B 19/10 |
| | | | 198/418.3 |
| 5,450,941 A | 9/1995 | Loewenthal | |
| 5,738,204 A * | 4/1998 | Baumgartner | B65G 15/44 |
| | | | 198/732 |
| 6,044,957 A * | 4/2000 | Guttinger | B65G 47/841 |
| | | | 198/358 |
| 6,112,880 A | 9/2000 | Flix | |
| 6,189,678 B1 * | 2/2001 | Loewenthal | B65B 23/14 |
| | | | 198/418.3 |
| 7,185,751 B2 | 3/2007 | Guidetti | |
| 7,497,426 B2 * | 3/2009 | Walther | B65H 3/0875 |
| | | | 270/52.14 |
| 7,909,157 B2 * | 3/2011 | Giuliani | B65B 9/067 |
| | | | 198/418.4 |
| 2003/0079962 A1 * | 5/2003 | Cerutti | B65G 47/31 |
| | | | 198/459.1 |
| 2014/0138212 A1 | 5/2014 | van de Loecht et al. | |
| 2015/0132096 A1 * | 5/2015 | Masini | B65G 19/02 |
| | | | 414/797.7 |

FOREIGN PATENT DOCUMENTS

| | | | | |
|---|---|---|---|---|
| EP | 2172398 | 7/2012 | | |
| EP | 2822884 | 12/2015 | | |
| GB | 2216508 | 10/1989 | | |
| GB | 2220400 | 1/1990 | | |
| GB | 2296914 A * | 7/1996 | | B65G 59/068 |
| WO | 9621612 | 7/1996 | | |

\* cited by examiner

METHOD AND SYSTEM FOR EXTRACTING ARTICLES

FIELD OF THE INVENTION

This disclosure relates to extracting at least one article from an array of articles.

BACKGROUND

Automatic packaging machines often include magazines to hold a plurality of products in stacks before the products are grouped together and packaged. However, there are a number of downsides with regard to the various magazine extraction equipment that extract products from magazines. For example, in some cases, the magazine extraction equipment requires a change of machine parts to handle products of various thicknesses. This halting of the magazine extraction equipment to switch to the appropriate machine parts results in an interruption of the automatic packaging process. As another example, some automatic packaging machines have magazine extraction equipment, which move the products at constant low speeds when handling products that are fragile or delicate. However, this slow handling of fragile or delicate products substantially limits the efficiency and throughput of the automatic packaging process.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a magazine extraction system includes a carrier, an extractor, and a catch element. The carrier is disposed below the magazine. The extractor is configured to move at least one article out of the magazine and along the carrier. The catch element is configured to move the at least one article away from the magazine and along a platform. The extractor is configured to move at a first velocity, which is less than a velocity of the catch element. The extractor is also configured to move at a second velocity, which is greater than the first velocity.

In an example embodiment, an apparatus includes a magazine and a magazine extraction system. The magazine is configured to hold a plurality of articles in an array. The magazine extraction system is configured to extract at least one article from the magazine. The magazine extraction system includes a carrier, an extractor, and a catch element. The carrier is disposed below the magazine. The extractor is configured to move the at least one article out of the magazine and along the carrier. The catch element is configured to move the at least one article away from the magazine and along a platform. The extractor is configured to move at a first velocity, which is less than a velocity of the catch element. The extractor is also configured to move at a second velocity, which is greater than the first velocity.

In an example embodiment, a method includes moving, via an extractor, at least one article out of the magazine and along the carrier. The method includes moving, via a catch element, at least one article away from the magazine and along a platform. The extractor is configured to move at a first velocity, which is less than a velocity of the catch element. The extractor is also configured to move at a second velocity, which is greater than the first velocity.

These and other features, aspects, and advantages of the present invention are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1A:
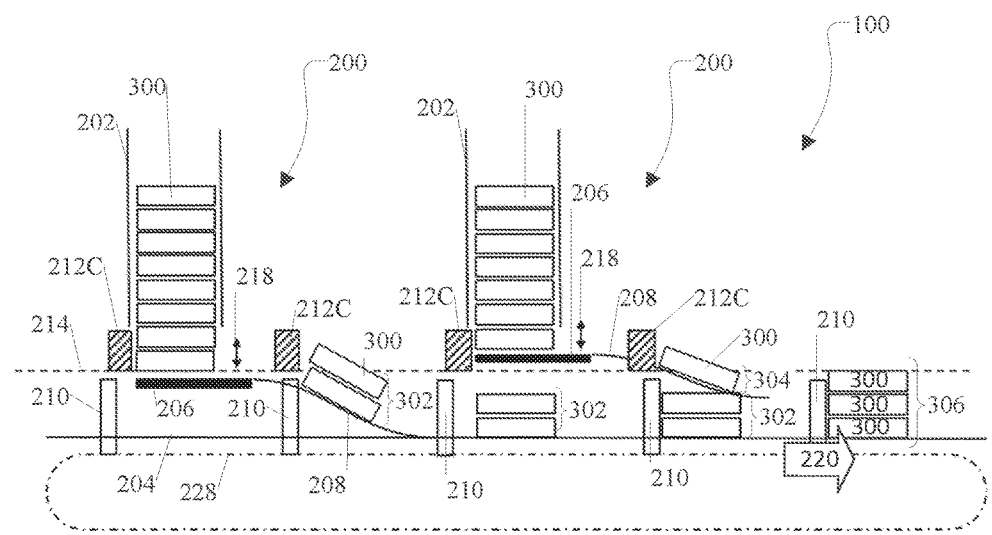
FIG. 1A is a side view of an apparatus according to an example embodiment of this disclosure.
Figure 1B:
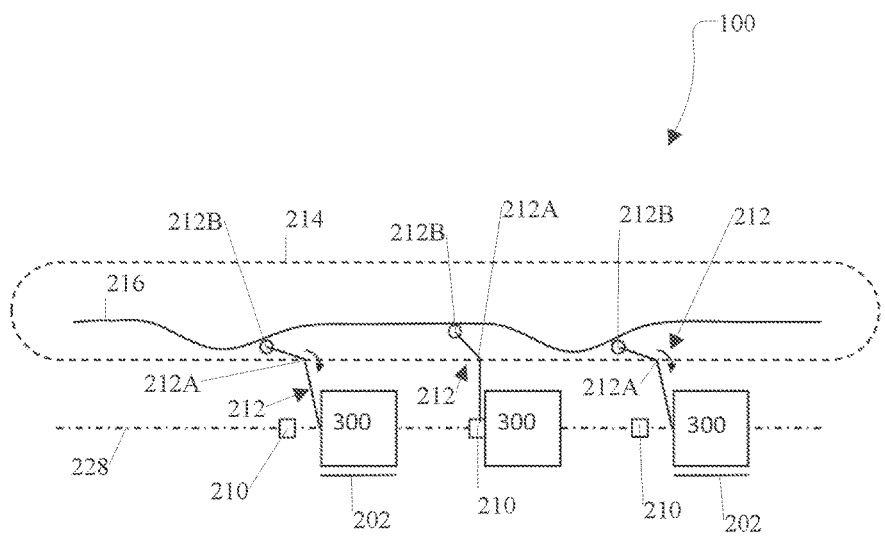
FIG. 1B is a plan view of the apparatus of FIG. 1A according to an example embodiment of this disclosure.

FIGS. 1A-1B illustrate an apparatus 100 according to an example embodiment. In an example embodiment, the apparatus 100 includes at least one magazine 202, which is configured to hold a plurality of articles 300 in a group, an array, or a stack. In an example embodiment, the plurality of articles 300 can be advanced or aligned in any suitable direction (e.g., vertical, angled, horizontal, etc.). In an example embodiment, an article 300 refers to any suitable product, which is able to be held by the magazine 202. For instance, in FIGS. 1A-1B, the articles 300 are flat or relatively flat products, such as biscuits, crackers, cookies, other food products, or any suitable items.

In an example embodiment, the apparatus 100 includes at least one magazine extraction system 200, which is configured to extract an appropriate number of articles 300 from a respective magazine 202 so that a predetermined number of articles 300 can be grouped together and packaged. For instance, as shown in FIG. 1A, the magazine extraction system 200 is configured to extract a first set 302 of articles 300 from a carrier 206 of the first magazine 202 via an extractor 212. In an example embodiment, the extractor 212 is configured to move in connection with a drive train 214. Upon extracting the first set 302 of articles 300 (e.g., two articles 300), the extractor 212 is configured to move the first set 302 of articles 300 down a slide 208, which is optional, and onto the platform 204. In an example embodiment, as shown in FIG. 1A, the first set 302 is advanced along the platform 204 by a respective catch element 210 in a conveying direction 220. In addition, the magazine extraction system 200 is configured to extract a second set 304 of articles 300 (e.g., one article 300) from the second magazine 202 and move the second set 304 on top of the first set 302 to form a predetermined number of articles 300 (e.g., three articles 300) in a pile 306 for packaging.

Figure 2:
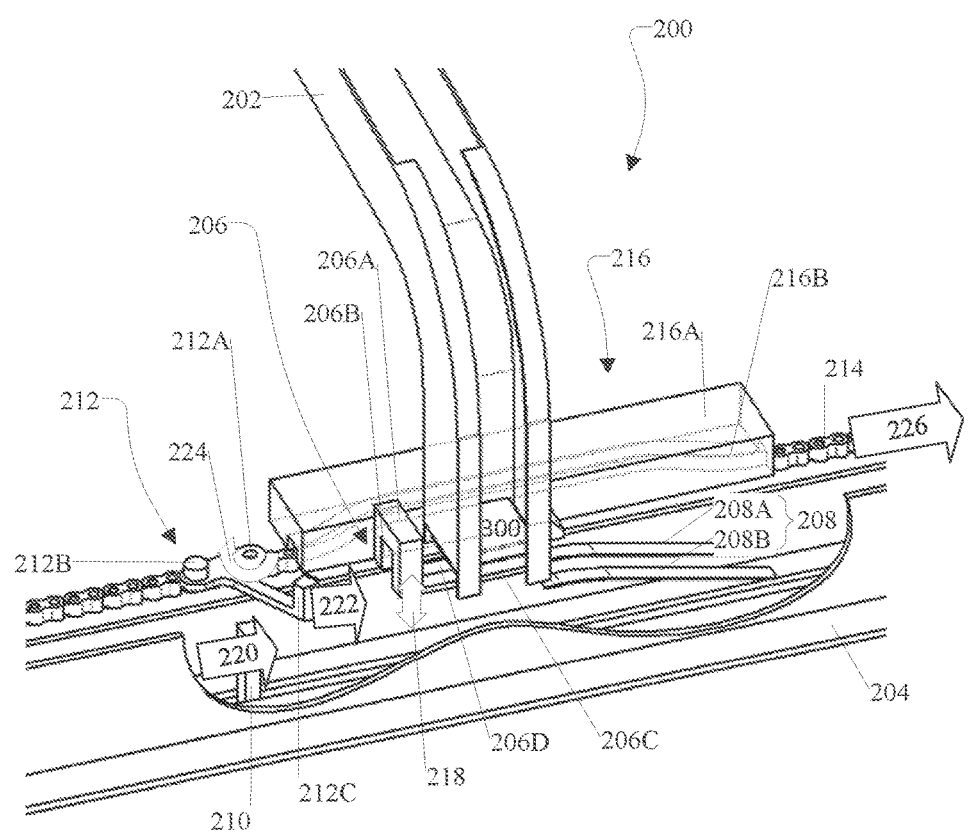
FIG. 2 is a perspective view of a magazine extraction system according to an example embodiment of this disclosure.

FIG. 2 is a perspective view of the magazine extraction system 200 according to an example embodiment. More specifically, in an example embodiment, the magazine extraction system 200 is configured to extract one or more articles 300 from a respective magazine 202 in a safe and controlled manner. In addition, the magazine extraction system 200 is configured to advance the extracted article 300 or articles 300 along the platform 204. In this regard, for example, the magazine extraction system 200 includes at least one carrier 206, at least one catch element 210, at least one extractor 212, at least one drive train (e.g., at least one drive train 214 and/or at least one drive train 228), at least one velocity controller 216, or any suitable combination thereof.

In an example embodiment, the platform 204 is configured to support the magazine extraction system 200. In an example embodiment, the platform 204 comprises a rigid structure. In an example embodiment, the platform 204 includes the drive train 228, which is configured to drive or move the catch element 210. In an example embodiment, the drive train 228 is connected to or integral with the catch element 210. In an alternative example embodiment (not shown), the drive train 228 is configured to drive each catch element 210 and each extractor 212 such that the inclusion of the drive train 214 is not necessary. In this regard, for example, the platform 204 is positioned underneath each magazine 202 so that the platform 204 is enabled to receive each extracted article 300 from the magazine 202.

In an example embodiment, the carrier 206 is configured to provide support to at least one article 300 from a respective magazine 202 during extraction. In an example embodiment, the carrier 206 is movable in at least first and second directions along an axis 218 (e.g., a downward direction and an upward direction). This feature is particularly advantageous in that the carrier 206 is configured to adjust to a variant number of articles 300 or variant thicknesses of articles 300. In this regard, for example, the carrier 206 is configured to move in at least the first direction (e.g., downwards) along the axis 218 to support thicker articles 300 and/or a greater number of articles 300. Also, in this example, the carrier 206 is configured to move in at least the second direction (e.g., upwards) along the axis 218 to support thinner articles 300 and/or a lesser number of articles 300. In an example embodiment, the carrier 206 is also configured to position itself such that no articles 300 (i.e., number of articles is zero) are extracted from a respective magazine 202, for example, when lane-balancing. In an example embodiment, the carrier 206 is controlled by a hardware and/or software controller, which is configured to control a movement of the carrier 206, for instance, in accordance with predetermined settings that correspond to input parameters regarding the articles 300.

In an example embodiment, the carrier 206 is a rigid structure. For instance, in an example embodiment, the carrier 206 includes an L-shaped cross-section, as shown in FIGS. 2-10. In this regard, for example, the carrier 206 includes a guide portion 206A that forms the vertical part of the L-shape and a base portion 206C that forms the horizontal part of the L-shape. In an example embodiment, the guide portion 206A and the base portion 206C comprise a monolithic structure or a plurality of structures that form a unitary member. In an example embodiment, the guide portion 206A includes an opening 206B, which is structured to receive the extractor 212 and enable the extractor 212 to pass through the opening 206B. Also, in an example embodiment, the base portion 206C includes a first arm and a second arm with a gap 206D. In an example embodiment, the gap 206D is positioned between the first arm and the second arm. In this regard, the carrier 206 is structured to enable the extractor 212 to pass through both the opening 206B and the gap 206D such that the extractor 212 is enabled to push at least one article 300 along surfaces of the base portion 206C and away from the magazine 202.

In an example embodiment, the base portion 206C of the carrier 206 is positioned below the magazine 202 such that the carrier 206 is able to receive at least a lowermost article 300 from a bottom side of the magazine 202. Also, in an example embodiment, the carrier 206 is positioned above the platform 204 to serve as an intermediary area between the respective magazine 202 and the platform 204. This feature is advantageous in ensuring the safe transfer of each extracted article 300 onto the platform 204.

In an example embodiment, the magazine extraction system 200 can optionally include the slide 208. In an example embodiment, the slide 208 is configured to provide a safe transition for each extracted article 300 between the carrier 206 and the platform 204, particularly when there is a substantial height difference between the carrier 206 and the platform 204. In this regard, according to an example embodiment, the slide 208 is configured to receive each extracted article 300 from the magazine 202 and facilitate the transfer of each extracted article 300 from the carrier 206 to the platform 204. In an example embodiment, the slide 208 is positioned between a respective magazine 202 and the platform 204. Also, in an example embodiment, the slide 208 is positioned between the carrier 206 and the platform 204. In an example embodiment, the slide 208 includes any suitable structure with at least one slope or incline, which enables the extracted article 300 to move along the slide 208 in a safe manner.

In an example embodiment, the slide 208 includes a first slide member 208A and a second slide member 208B. In an example embodiment, the slide 208 is structured to direct each article 300 from the carrier 206 towards the platform 204. In an example embodiment, the slide 208 comprises a flexible material or any suitable material. In FIG. 2, for example, the first slide member 208A and the second slide member 208B are spaced apart from each other by a gap, which is sized to receive at least a part of the catch element 210 and enable the catch element 210 to push the extracted article 300 along the slide 208 in a safe manner.

In an example embodiment, the catch element 210 is configured to move at least one article 300 in the conveying direction 220. In an example embodiment, the catch element 210 is any suitable mechanical device, which is enabled to advance the article 300 in the conveying direction 220 without causing damage to the article 300. For example, in FIGS. 2-9, the catch element 210 is an elongated structure, which is configured to guide one or more articles 300 along the supply line. Also, as shown in FIGS. 2-9, the catch element 210 can be structured to move the extracted article 300 or articles 300 along the slide 208 and along a platform 204 when the slide 208 is included as a part of the apparatus 100.

In an example embodiment, the extractor 212 is configured to extract at least one article 300 from the magazine 202 during an extraction operation. Also, in an example embodiment, the extractor 212 is configured to move the extracted article 300 or articles 300 away from the magazine 202 and along a platform 204. In this regard, for example, the extractor 212 is configured to advance the article 300 or articles 300 in an extraction direction 222, which is parallel or angled to the conveying direction 220. In an example embodiment, the extractor 212 includes a first end portion and a second end portion. More specifically, in an example embodiment, the first end portion of the extractor 212 includes a connection part 212A, which is connected to a drive train 214 and configured to move with the drive train 214 in a moving direction 226. In an example embodiment, the drive train 214 is a chain, a belt, a suitable mechanical device, a suitable electromechanical device, or any combination thereof. In an alternative example embodiment (not shown), the drive train 214 is configured to drive each extractor 212 and each catch element 210 such that the inclusion of drive train 228 is not necessary. In an example embodiment, the first end portion includes a guiding part 212B, which is configured to interact with a steering profile 216B, such as the guide groove, and guide the extractor 212 through the body 216A of the steering cam.

In an example embodiment, the second end portion includes a pusher 212C. In an example embodiment, the pusher 212C is structured to extract at least one article 300 from the magazine 202 by pushing one or more articles 300 from the carrier 206 along a platform 204. In an example embodiment, the pusher 212C is configured to rotate in at least a first rotational direction 224. Additionally or alternatively, in an example embodiment, the pusher 212C is configured to move in a direction that is parallel or angled to the extraction direction 222. In an example embodiment, the rotation of the pusher 212C about the connection part 212A enables the pusher 212C to achieve at least a first velocity v1. In this regard, for example, this first velocity v1 can be slower or less than a previous and/or a subsequent velocity of the extractor 212. In an example embodiment, this first velocity v1 can be slower or less than the velocity of the catch element 210.

In an example embodiment, the velocity controller 216 is configured to control the velocity, the movement, and the position of the pusher 212C such that each article 300 is handled with little to no impact. For instance, in FIGS. 2-10, the velocity controller 216 is a steering cam. In an example embodiment, the steering cam includes a body 216A (such as a block or another structure) comprising a suitable material, such as plastic or the like. In an example embodiment, the steering cam includes at least one steering profile 216B. In an example embodiment, the steering profile 216B includes a one-sided steering cam (e.g., FIG. 1B), a two-sided steering cam (e.g., FIGS. 2-10), or any suitable steering structure. For instance, in FIGS. 2-10, the steering profile 216B is a guide groove, which extends along the entire length of the body 216A. In an example embodiment, the guide groove is structured to receive the guiding part 212B of the pusher 212C. In an example embodiment, the guide groove provides a path, which is structured to control a velocity and movement of the pushing part of the extractor 212. In this regard, for example, the path includes a fast portion, which enables the pusher 212C to move at a faster pace when the pusher 212C is not extracting at least one article 300 from the magazine 202. Also, in this example, the path includes a slower portion, which is slower than the fast portion. In an example embodiment, the slower portion is configured to reduce the velocity of the pusher 212C such that the pusher 212C is configured to move at the first velocity v1 and extract at least article 300 from the magazine 202 with little or no impact on the article 300 or articles 300. In this regard, for example, the slow portion is curved to reduce the velocity of the pusher 212C through the body 216A. Further, in this example embodiment, the velocity controller 216 is structured such that the movement of the pusher 212C is able to synchronize with the movement of the catch element 210 for a predetermined amount of time or for a predetermined distance.

As discussed above, the apparatus 100 includes at least one magazine 202 and at least one magazine extraction system 200. In an example embodiment, the magazine extraction system 200 includes a number of components, which are configured to extract at least one article 300 from the respective magazine 202 with little to no impact on the extracted article 300 or articles 300. Moreover, the magazine extraction system 200 is configured to provide continuous guidance of each article 300 via the extractor 212 and the catch element 210. In this regard, the magazine extraction system 200 is configured to operate in a manner that ensures that each article 300, which may be fragile, is extracted from the magazine 202 without damage and without delay.

Figure 3:
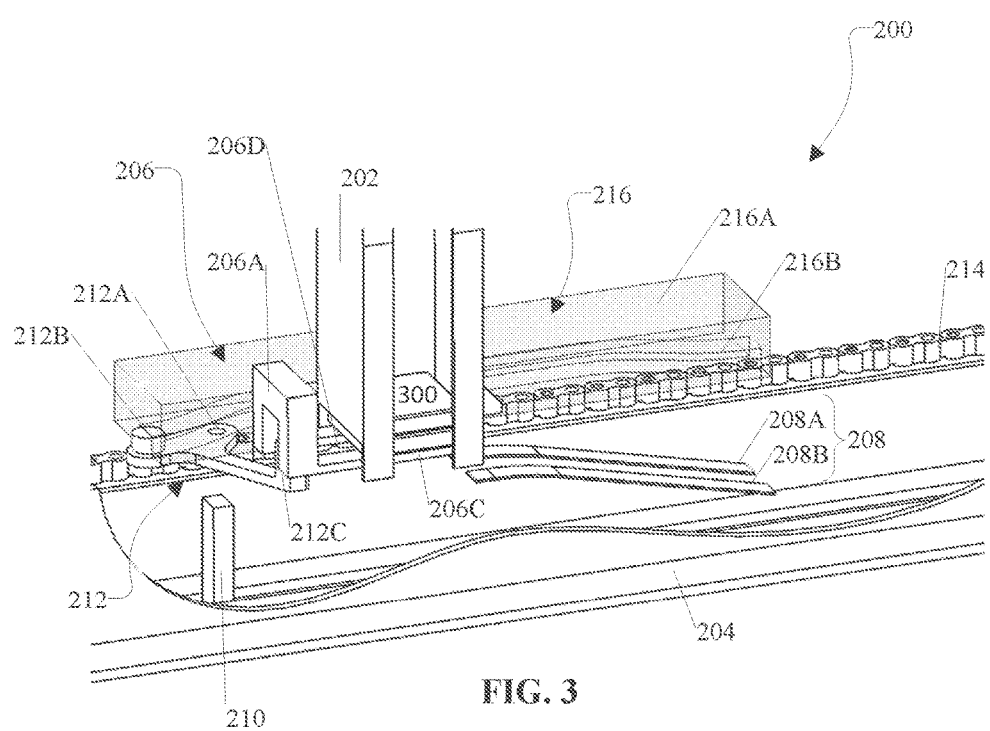
FIG. 3 is a perspective view of a magazine extraction system when an extractor is approaching a magazine according to an example embodiment of this disclosure.
Figure 4:
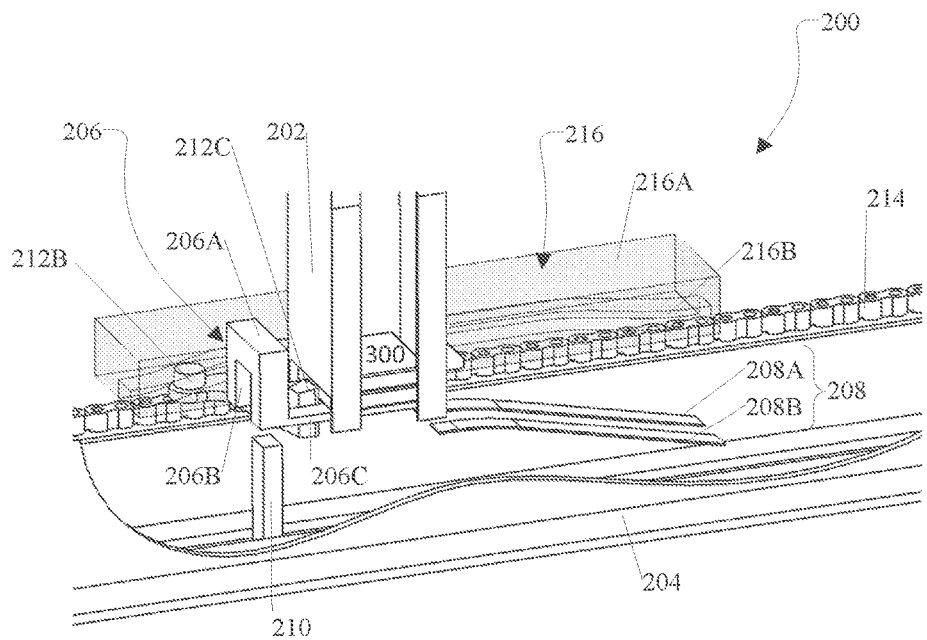
FIG. 4 is a perspective view of a magazine extraction system before an extractor extracts at least one article from a magazine according to an example embodiment of this disclosure.
Figure 5:
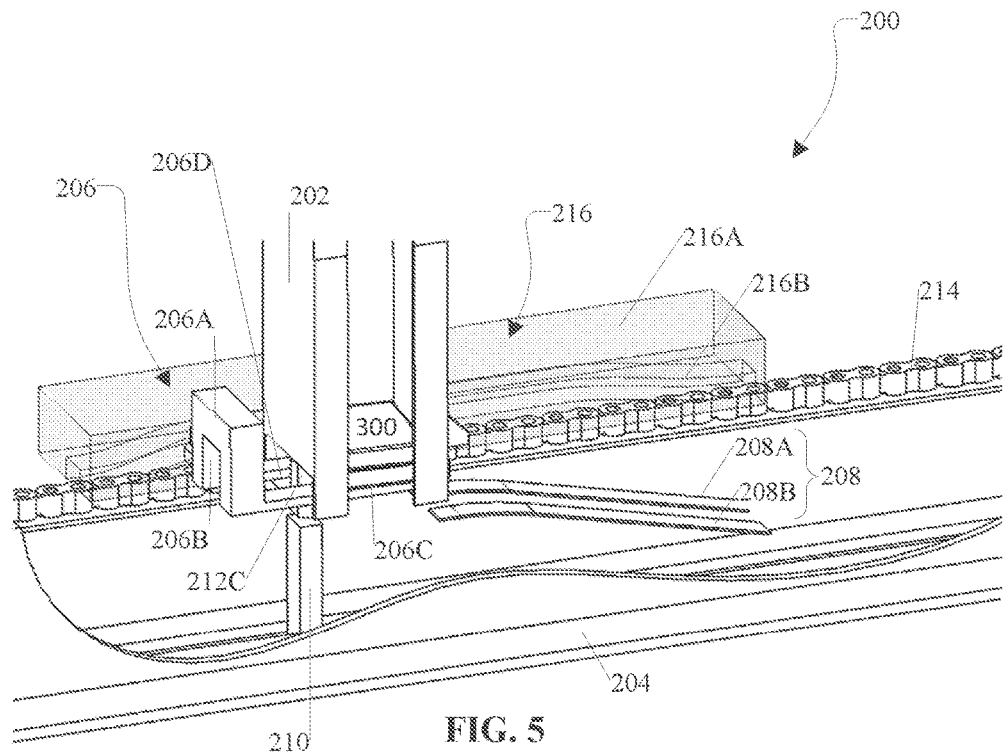
FIG. 5 is a perspective view of a magazine extraction system when an extractor is extracting at least one article from a magazine according to an example embodiment of this disclosure.
Figure 6:
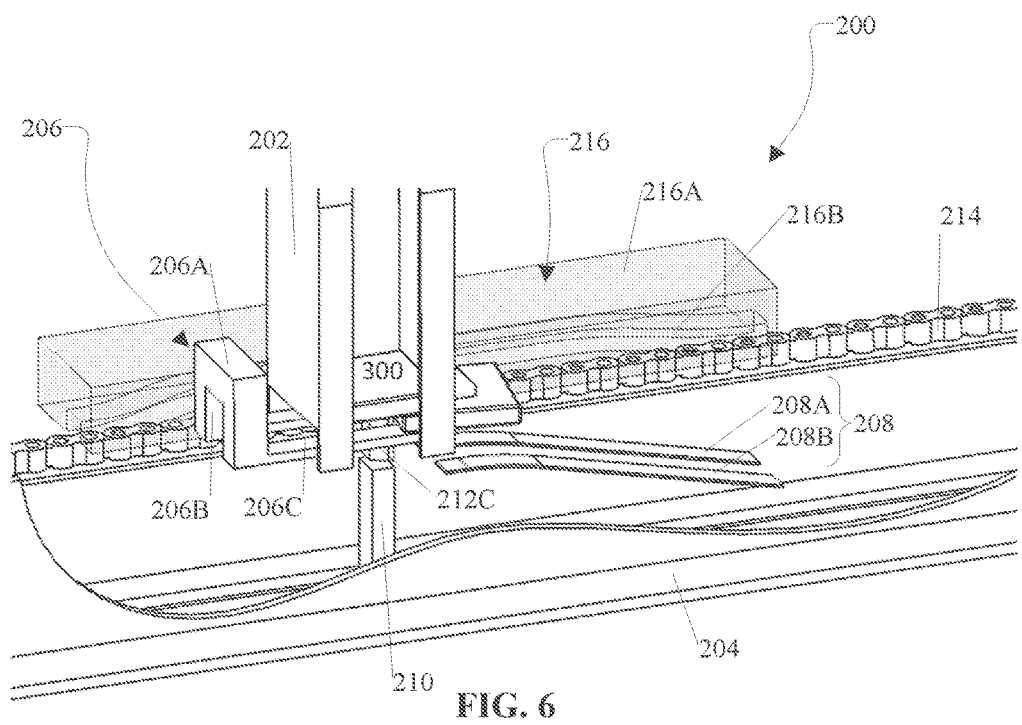
FIG. 6 is a perspective view of a magazine extraction system when an extractor is extracting at least one article from a magazine according to an example embodiment of this disclosure.
Figure 7:
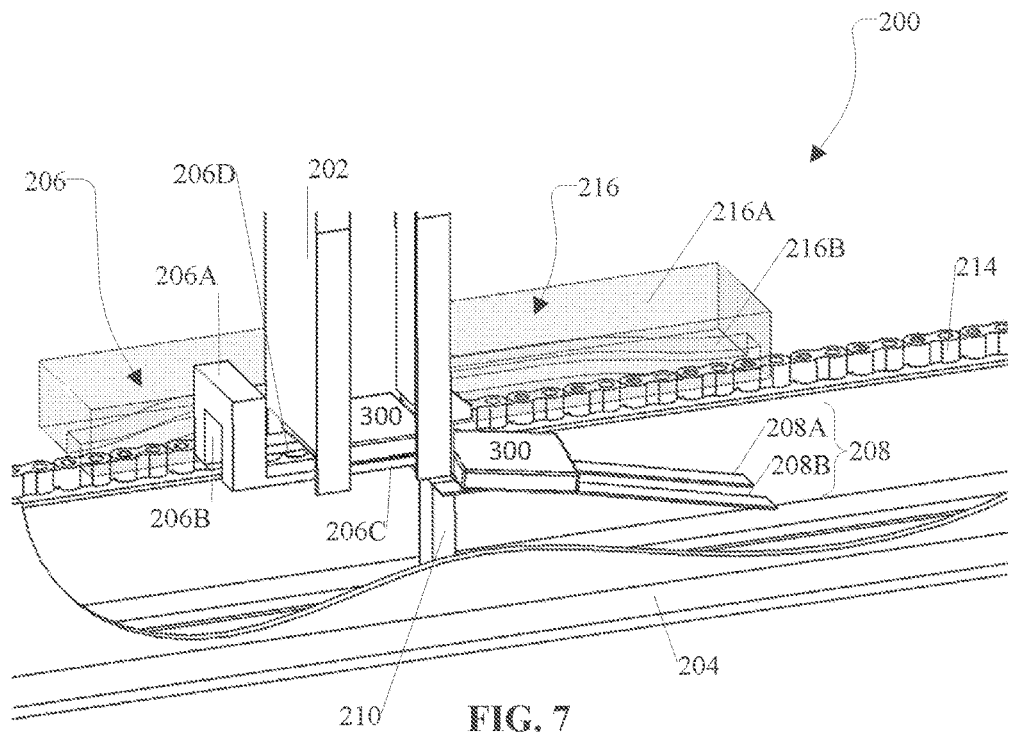
FIG. 7 is a perspective view of a magazine extraction system when an extractor moves at least one extracted article away from a magazine according to an example embodiment of this disclosure.
Figure 8:
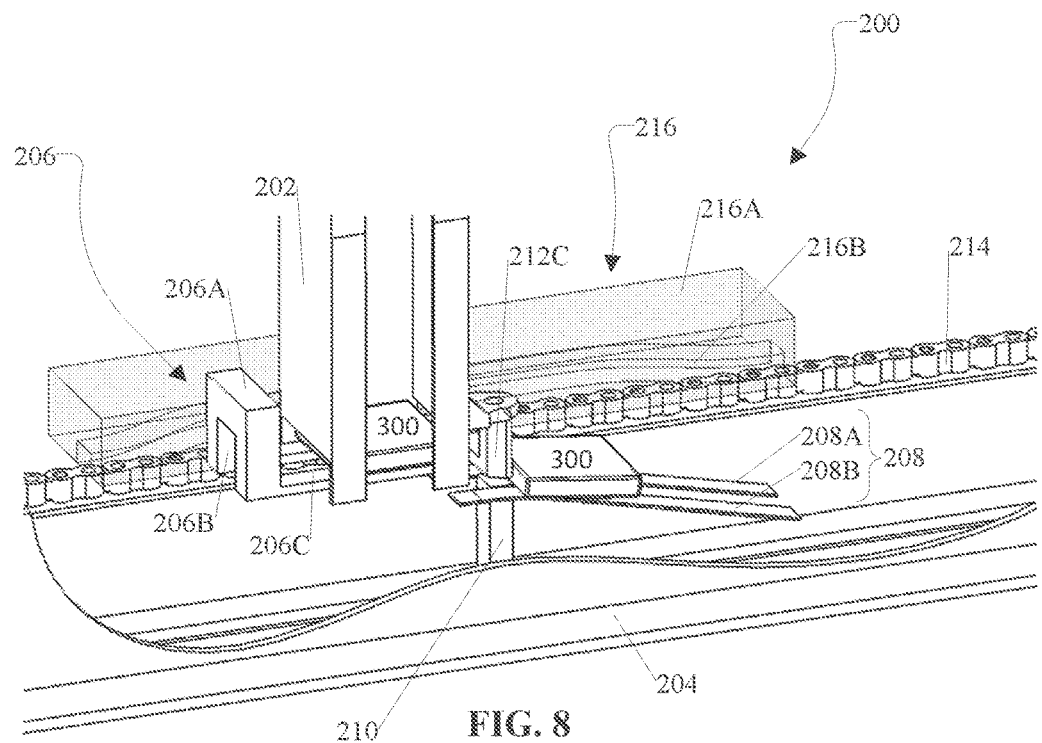
FIG. 8 is a perspective view of a magazine extraction system when a catch element moves at least one extracted article along a slide according to an example embodiment of this disclosure.
Figure 9:
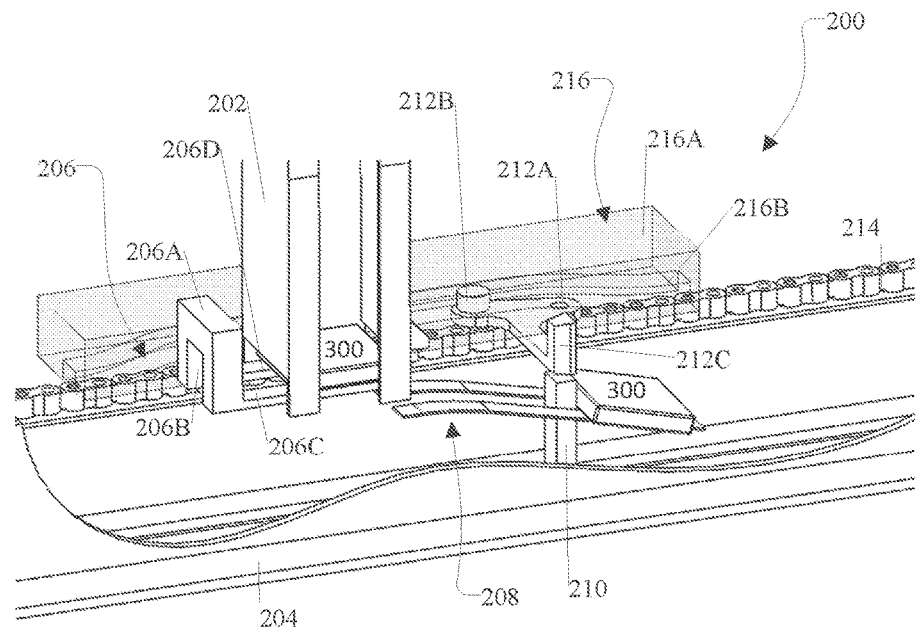
FIG. 9 is a perspective view of a magazine extraction system when a catch element moves at least one extracted article along a slide and towards a platform according to an example embodiment of this disclosure.
Figure 10:
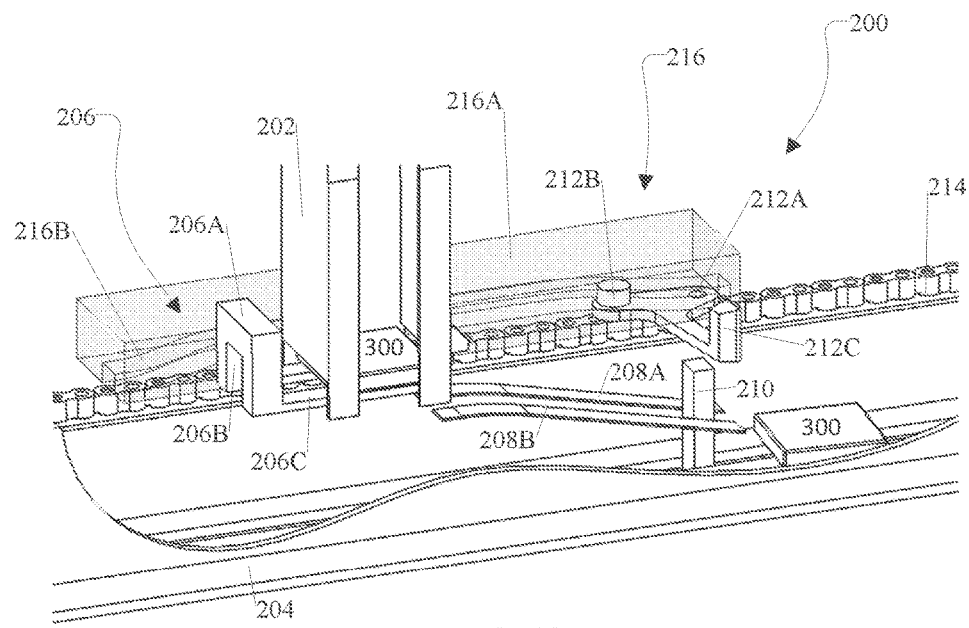
FIG. 10 is a perspective view of a magazine extraction system when at least one extracted article is moved onto a platform according to an example embodiment of this disclosure.

FIGS. 3-10 illustrate enlarged views of different stages of extracting at least one article 300 from a magazine 202 according to an example embodiment. For example, FIGS. 3-4 illustrate the magazine extraction system 200 before at least one article 300 is extracted from the magazine 202. FIGS. 5-6 illustrate the magazine extraction system 200 while at least one article 300 is being extracted from the magazine 202. FIG. 7 illustrates the magazine extraction system 200 when at least one article 300 is guided from the carrier 206 and onto the slide 208. FIGS. 8-9 illustrate the magazine extraction system 200 while at least one article 300 is being guided along the slide 208. FIG. 10 illustrates the magazine extraction system 200 when at least article 300 moves onto the platform 204.

Figure 11:
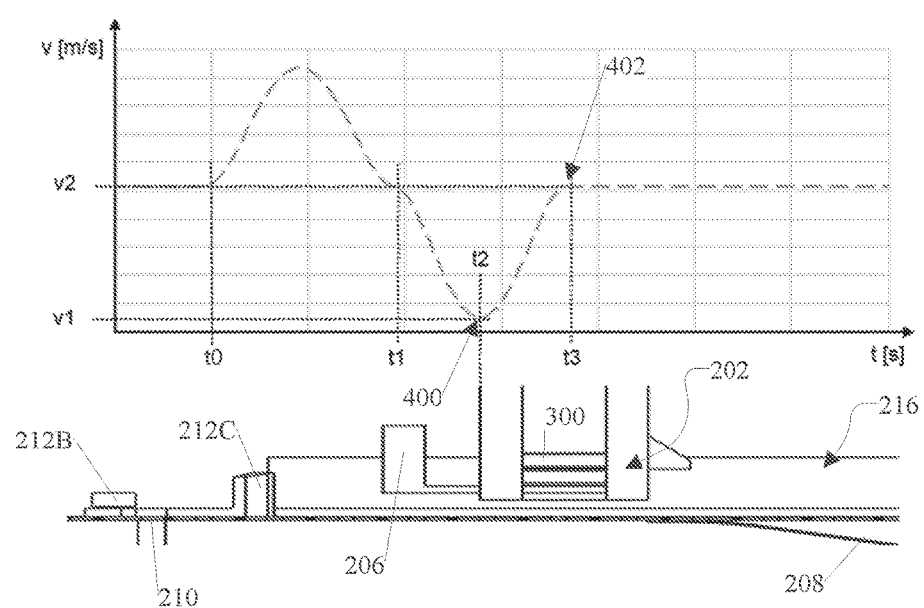
FIG. 11 is a graph illustrating the velocity of the pusher of the extractor as a function of time according to an example embodiment of this disclosure.

FIG. 11 is a graph, which illustrates the velocity of the pusher 212C as a function of time. In this regard, the y-axis of the graph indicates the velocity, which is measured in meters per second ("m/s") and the x-axis of the graph indicates the time, which is measured in seconds ("s"). Also, in FIG. 11, a side view of the magazine extraction system 200 is illustrated below the graph. More specifically, the magazine extraction system 200 is illustrated in conjunction with a graph to serve as a frame of reference with regard to discussion relating to one of the time markers (i.e., time marker for a time t2) on the graph, as discussed below.

As shown in FIG. 11, the graph includes several time markers, such as a time marker for a time t0, a time marker for a time t1, a time marker for a time t2, and a time marker for a time t3. More specifically, t0 represents a time in which the pusher 212C is at the second velocity v2 before extracting at least one article 300 from the magazine 202. For instance, t0 can occur at 0.33 seconds or any suitable time. Next, during a time frame from t0 to t1, the pusher 212C is generally involved in a setup movement. For instance, in an example embodiment, the setup movement includes rotating the extractor 212 in an opposite direction to that of rotational direction 224 so that the pusher 212C is in proper position. As shown in FIG. 11, t1 represents a time in which the velocity of the pusher 212C is at the second velocity v2. For instance, t1 can occur at 0.43 seconds or any suitable time. Afterwards, during a time frame from t1 to t2, the velocity of the pusher 212C begins to decrease from the second velocity v2 to the first velocity v1 as the pusher 212C approaches the magazine 202. In this regard, t2 represents a time in which the pusher 212C reaches the magazine 202, as indicated, for instance, by the extension of the time marker for t2 in relation to the magazine extraction system 200, which is illustrated below the graph in FIG. 11. For instance, t2 can occur at 0.48 seconds or any suitable time. Furthermore, during a time frame from t2 to t3, the pusher 212C is in contact with at least one article 300. Moreover, as shown in FIG. 11, t3 represents a time in which the pusher 212C reaches the second velocity v2. For instance, t3 can occur at 0.53 seconds or any suitable time. In this regard, after the moving at the first velocity v1 to contact and extract each article 300, the pusher 212C increases to the second velocity v2 to ensure that each extracted article 300 is handled in an efficient manner.

As discussed above and as shown in FIGS. 3-10, during the extraction process, each article 300 has a velocity profile, which is variable. More specifically, each article 300 starts from rest in the magazine 202 before increasing from a lower velocity to a higher velocity in accordance with the velocity profile of the pusher 212C, which increases from at least the first velocity v1 to the second velocity v2. In this regard, for example, the first velocity v1 of the pusher 212C is a value within a range of 0 m/s to 5 m/s, thereby providing little or no impact to each article 300 at rest. For instance, in FIG. 11, the first velocity v1 of the pusher is 5 m/s. However, after the pusher 212C gently and carefully handles each article 300 at the first velocity v1, the pusher 212C increases to the second velocity v2 since each extracted article 300 can now be handled at a greater velocity without damage. In this regard, for example, the second velocity v2 of the pusher 212C is a value within a range of 45 m/s to 50 m/s. For instance, in FIG. 11, the second velocity v2 is 50 m/s. Accordingly, each article 300 is able to be handled at an appropriate speed at an appropriate time with little or no damage.

In an example embodiment, the second velocity v2 can be less than, equal to, or greater than a velocity of the catch element 210 so long as the pusher 212C is enabled to provide each article 300 to the catch element 210 in a safe manner. As one example, for instance, the magazine extraction system 200 is configured to operate the pusher 212C and the catch element 210 at a similar or substantially similar velocity, as shown in at least FIGS. 7-9, for a predetermined time period or a predetermined distance. Additionally or alternatively, for instance, the pusher 212C and the catch element 210 are configured to be synchronized in movement, speed, timing, distance, or the like. By providing a suitable and appropriate relationship between the pusher 212C and the catch element 210, the magazine extraction system 200 is enabled to ensure that there each article 300 safely transitions from the pusher 212C to the catch element 210 with little or no impact on each article 300.

As discussed above, in an example embodiment, the magazine extraction system 200 includes at least one carrier 206, at least one catch element 210, at least one extractor 212, at least one drive train (e.g., at least one drive train 214 and/or at least one drive train 228), at least one velocity controller 216, or any suitable combination thereof. Further, as discussed above, the velocity controller 216 includes a steering cam, as shown in FIGS. 2-10. However, the apparatus 100 and/or the magazine extraction system 200 are not limited to the above configurations. To further illustrate this point, other non-limiting example embodiments are discussed below.

Figure 12A:
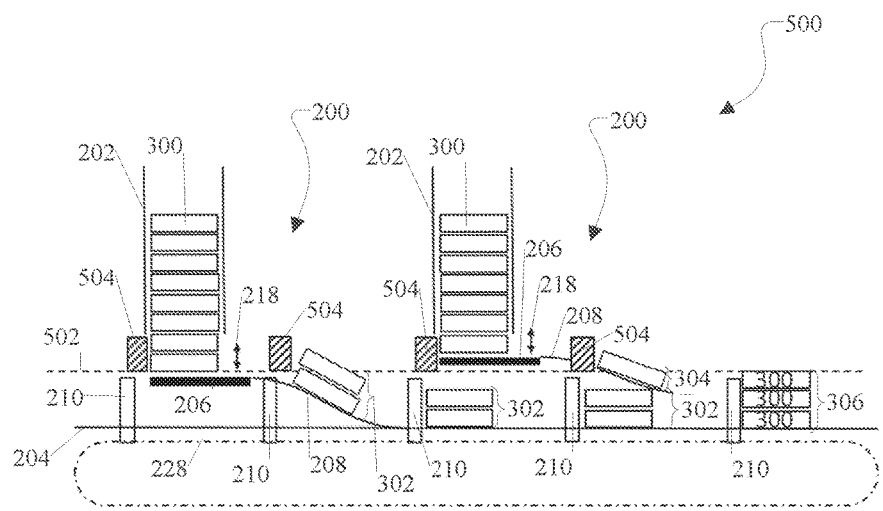
FIG. 12A is a side view of the apparatus according to an alternative example embodiment of this disclosure.
Figure 12B:
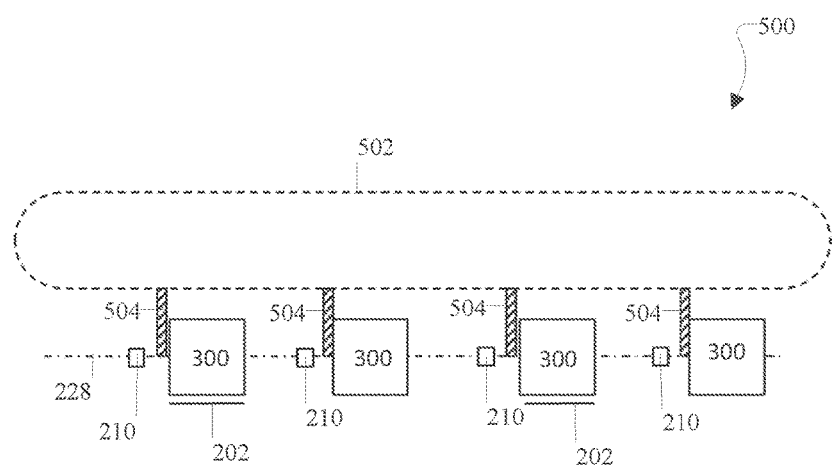
FIG. 12B is a plan view of the apparatus according to the alternative example embodiment of FIG. 12A of this disclosure.

FIGS. 12A-12B illustrate an apparatus 500 with at least one magazine extraction system 200 according to an alternative example embodiment. More specifically, FIG. 12A is a side view of the apparatus 500. Meanwhile, FIG. 12B is a plan view of the apparatus 500. As shown in FIGS. 12A-12B, the magazine extraction system 200 includes at least one extractor 504, which is fixed on a servo-controlled drive train 502. In this regard, the velocity controller 216 includes a servo motor (or any suitable type of motor) instead of the steering cam. In an example embodiment, the servo motor is configured to drive the drive train 502 such that each extractor 504 moves at variable velocities, such as at the first velocity v1 and the second velocity v2.

Figure 13A:
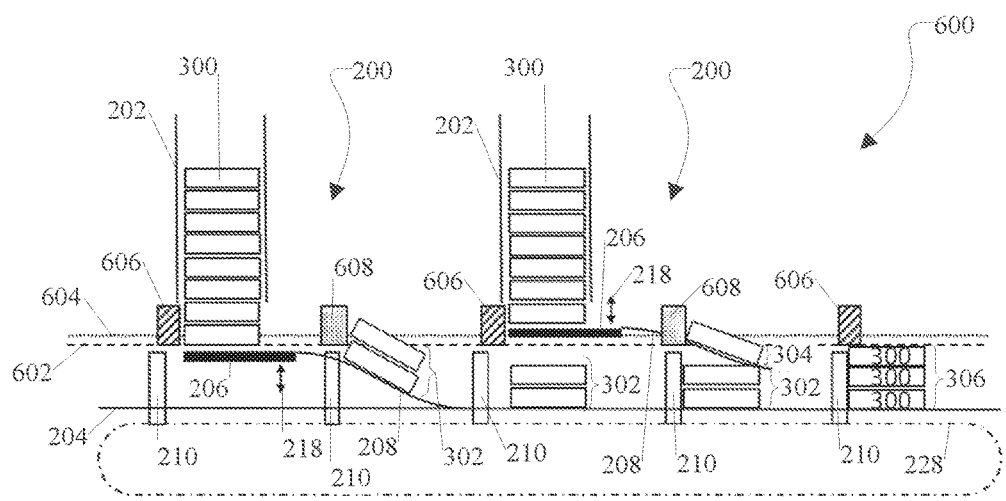
FIG. 13A is a side view of the apparatus according to an alternative example embodiment of this disclosure.
Figure 13B:
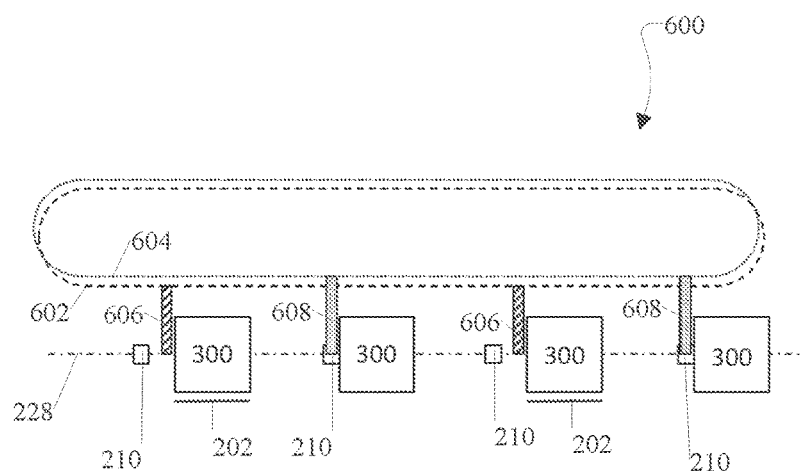
FIG. 13B is a plan view of the apparatus according to the alternative example embodiment of FIG. 13A of this disclosure.

FIGS. 13A-13B illustrate an apparatus 600 with at least one magazine extraction system 200 according to an alternative example embodiment. More specifically, FIG. 13A is a side view of the apparatus 600. Meanwhile, FIG. 13B is a plan view of the apparatus 600. As shown in FIGS. 13A-13B, the apparatus 600 includes at least two independently velocity-controlled drive trains, such as drive train 602 and drive train 604. In an example embodiment, the velocity-controlled drive train 602 includes at least one extractor 606 and the velocity-controlled drive train 604 includes at least one extractor 608. In this regard, for example, the extractor 606 and the extractor 608 are alternately used in extracting articles from the magazines 202. With such a configuration, the apparatus 600 is able to provide greater flexibility during the magazine extraction process by doubling the time available for the total movement of each of the extractors 606 and 608.

Figure 14A:
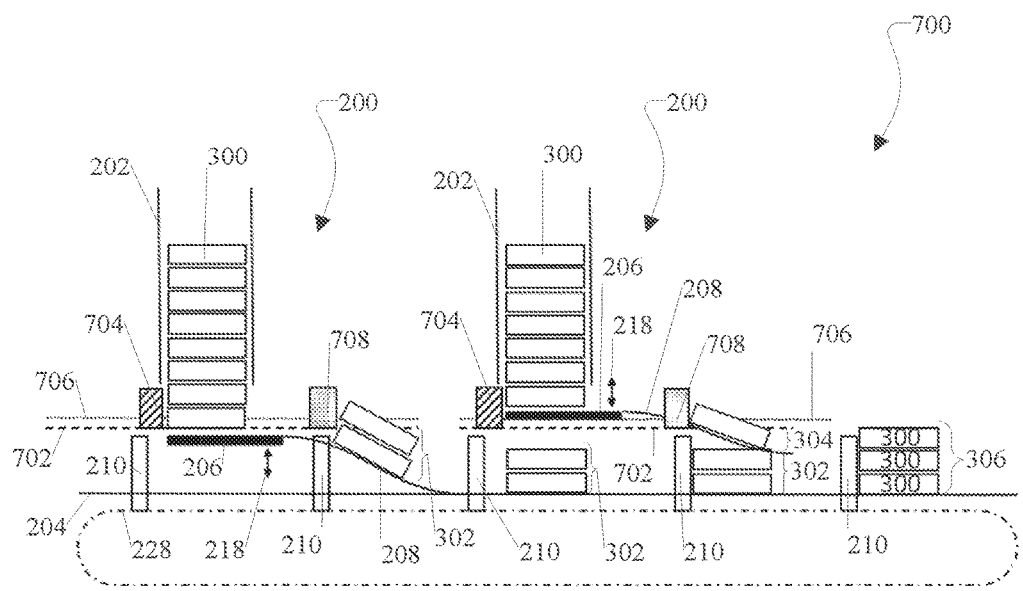
FIG. 14A is a side view of the apparatus according to an alternative example embodiment of this disclosure.
Figure 14B:
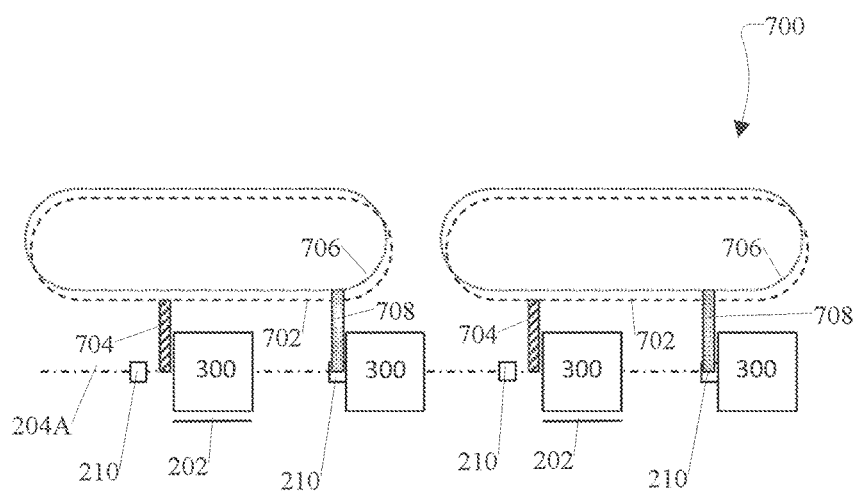
FIG. 14B is a plan view of the apparatus according to the alternative example embodiment of FIG. 14A of this disclosure.

FIGS. 14A-14B illustrate an apparatus 700 with at least one magazine extraction system 200 according to an alternative example embodiment. More specifically, FIG. 14A is a side view of the apparatus 700. Meanwhile, FIG. 14B is a plan view of the apparatus 700. As shown in FIGS. 14A-14B, the magazine extraction system 200 includes a plurality of extractors, which are each dedicated to a single magazine 202. In this regard, for instance, each magazine extraction system 200 includes a first drive train 702 with at least a first extractor 704 and a second drive train 706 with at least a second extractor 708. In this regard, the apparatus 700 is configured to include one or more drive trains per magazine extraction system 200.

Figure 15A:
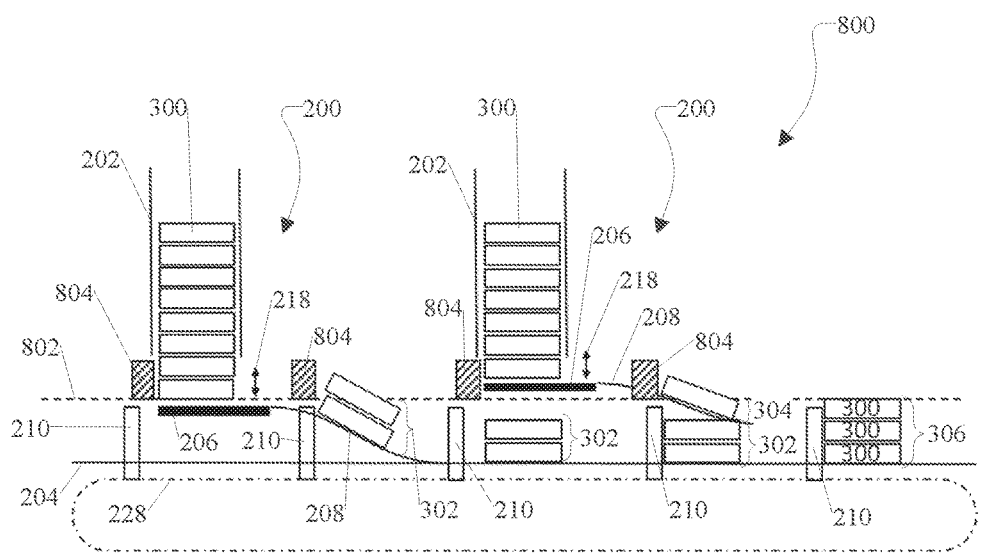
FIG. 15A is a side view of the apparatus according to an alternative example embodiment of this disclosure.
Figure 15B:
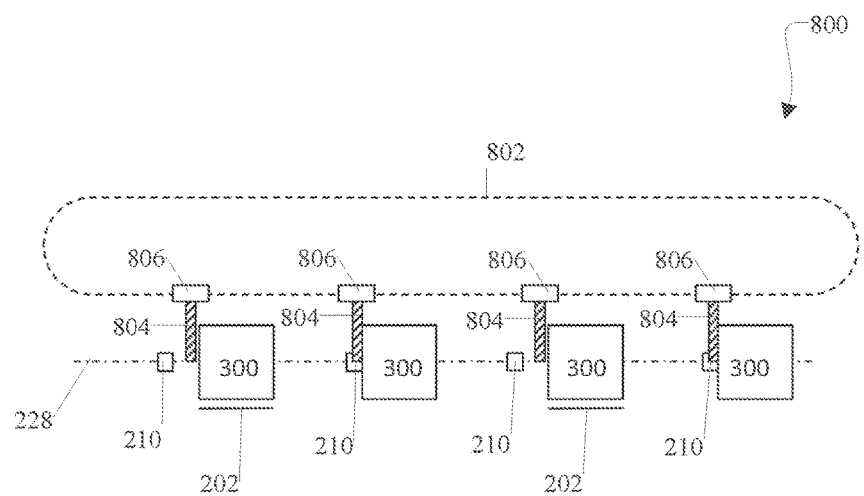
FIG. 15B is a plan view of the apparatus according to the alternative example embodiment of FIG. 15A of this disclosure.

FIGS. 15A-15B illustrate an apparatus 800 with at least one magazine extraction system 200 according to an alternative example embodiment. More specifically, FIG. 15A is a side view of the apparatus 800. Meanwhile, FIG. 15B is a plan view of the apparatus 800. As shown in FIGS. 15A-15B, the apparatus 800 includes an electromagnetic transport system 802 with at least one independently controlled extractor 804. In an example embodiment, each magazine 202 is configured to include the electromagnetic transport system 802 with at least one independently controlled extractor 804. In an example embodiment, each extractor 804 is mounted to the electromagnetic transport system 802 via a mounting mechanism 806. For instance, in an example embodiment, the mounting mechanism 806 includes a cart (or any suitable connector) on which at least one extractor 804 is mounted. With such a configuration, the apparatus 800 is configured to adapt the velocity profile of each extractor 804 in accordance with characteristics of the article 300. In this regard, each extractor 804 is able to be individually controlled with a customized velocity profile.

Figure 16A:
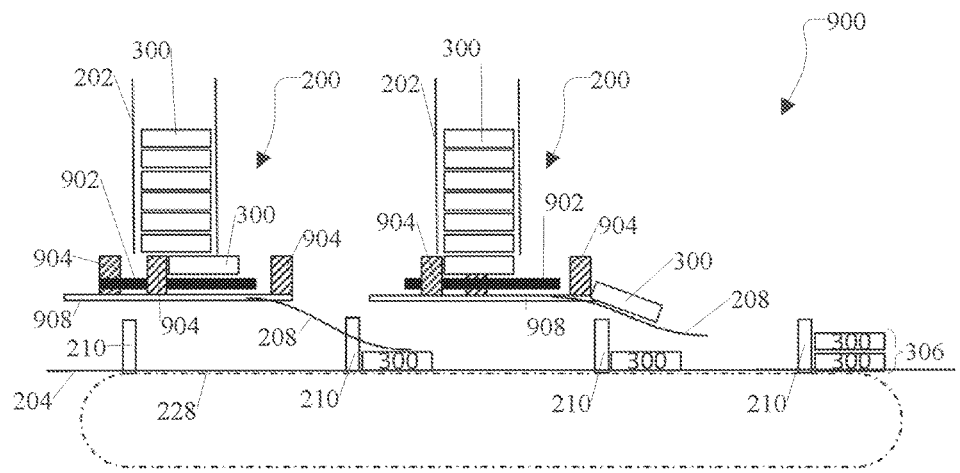
FIG. 16A is a side view of the apparatus according to an alternative example embodiment of this disclosure.
Figure 16B:
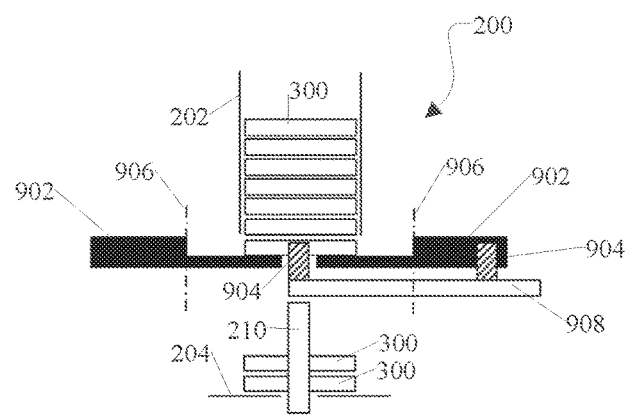
FIG. 16B is a cross-sectional view of a part of the apparatus according to the alternative example embodiment of FIG. 16A of this disclosure.
Figure 16C:
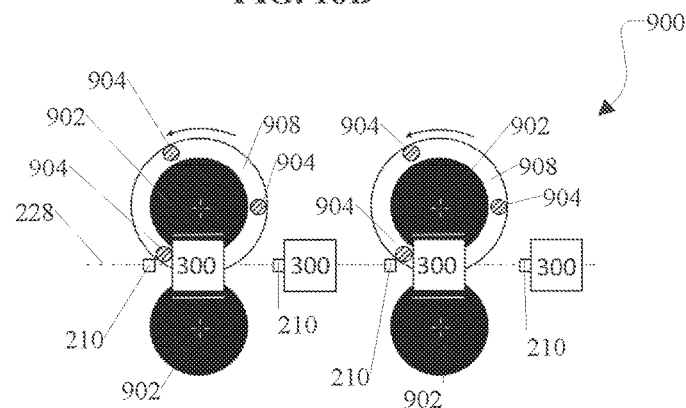
FIG. 16C is a plan view of the apparatus according to the alternative example embodiment of FIG. 16A of this disclosure.

FIGS. 16A-16C illustrate an apparatus 900 with at least one magazine extraction system 200 according to an alternative example embodiment. More specifically, FIG. 16A is a side view of the apparatus 900. Meanwhile, FIG. 16B is a cross sectional view of a part of the apparatus 900. In addition, FIG. 16C is a plan view of the apparatus 900. In an example embodiment, the apparatus 900 includes at least one carrier 902, which is configured to provide support to at least one article 300. For example, in FIGS. 16A-16C, the carrier 902 includes discs or disc-like structures to provide support to at least the lowermost article 300 of the magazine 202. As shown in FIG. 16B, the carrier 902 includes a first disc (or disc-like structure) on one side of the magazine 202 and a second disc (or disc-like structure) on an opposite side of the same magazine 202. Also, as shown in FIG. 16B, each disc or disc-like structure includes at least a first portion with a first thickness and a second portion with a second thickness. In this regard, the first portion is thinner than the second portion such that the first portion is configured to accommodate a greater number of articles 300 and/or thicker articles 300 than that of the second portion. In this example embodiment, each disc or disc-like structure is configured to rotate about rotational axis 906 such that a selected portion (e.g., first portion or second) is positioned to support at least one article 300. Accordingly, the carrier 902 is configured to accommodate a different number of articles 300 and/or different thicknesses of articles 300 in a seamless manner without having to halt the operation thereof.

In an example embodiment, the apparatus 900 includes an extractor device 904, which is structured to extract at least one article 300 from the magazine 202 while moving along a curved path. In this regard, for example, the extractor device 904 includes at least one rotating device, such as a disc, a disc-like structure, a rotating pin, the like, or any combination thereof. For instance, in FIGS. 16A-16C, the extractor device 904 includes a rotating pin, which is connected to a base 908 (e.g., a disc, a disc-like structure, an arm, or the like). In an example embodiment, the base 908 is configured to rotate about rotational axis 906 such that the pin moves about the rotational axis 906 to various rotational positions including at least a position between the first and second discs (or disc-like structures) of the carrier 902, thereby enabling the pin to extract at least one article 300 from the magazine 202. With such a configuration, the apparatus 900 is able to perform magazine extraction via a rotational movement of the extractor device 904 about the rotational axis 906 with variable velocity. Accordingly, the extractor device 904 is velocity-controlled to provide little to no impact upon extracting each article 300 from a respective magazine 202.

Figure 17:
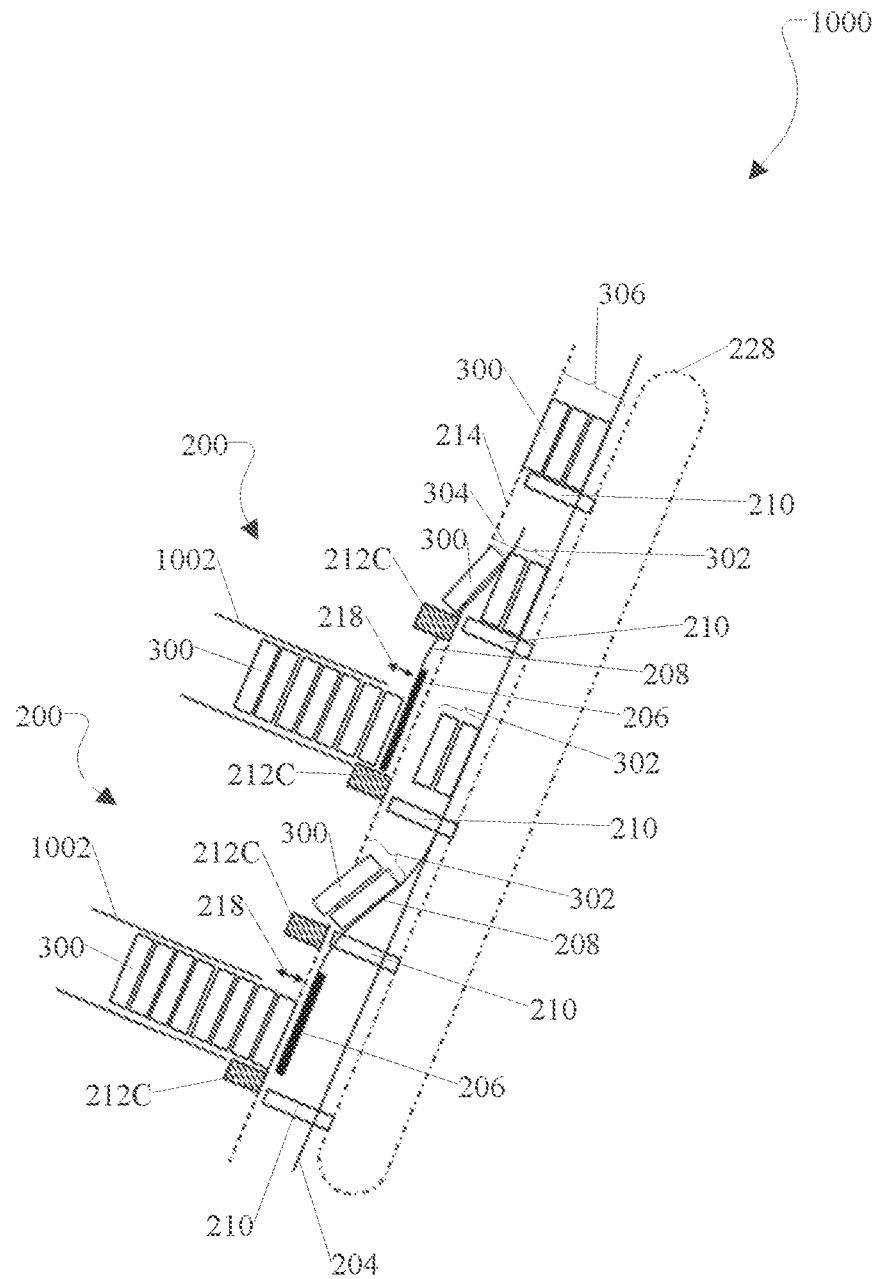
FIG. 17 is a side view of the apparatus with at least one magazine oriented at a predetermined angle according to an alternative example embodiment of this disclosure.

FIG. 17 is a side view of an apparatus 1000 with at least one magazine extraction system 200 having a different magazine configuration than that of FIG. 1 according to an example embodiment. In an example embodiment, the apparatus 1000 includes one or more magazines 1002, which are strategically oriented based on a number of factors. In FIG. 17, for example, the apparatus 1000 includes at least one magazine 1002, which is oriented at an angle. In this regard, for example, each magazine 1002 can be oriented to provide an article infeed direction that is in a range from 0 to 90 degrees. In such a case, the apparatus 1000 includes the drive train 214, which is perpendicular or substantially perpendicular to each magazine 1002. Accordingly, this angled configuration is particularly advantageous for articles 300, which are fragile, as less pressure is placed on these articles 300.

FIGS. 18A-18D illustrate a carrier 1100 according to an alternative example embodiment. In this regard, for example, the carrier 1100 includes a first support member 1102 and a second support member 1104, which are each configured to move to various positions along an advancing direction of each article 300, such as along a linear axis, a rotational axis, or the like. For instance, in FIGS. 18A-18D the carrier 1100 is configured to move along at least one axis, such as a vertical axis. Each of the various positions can be set based on characteristics of the article 300. For instance, certain parameters regarding the article 300 can be input into a software and/or hardware controller of the carrier 1100 to adjust the settings of the various positions of the first support member 1102 and the second support member 1104. In this regard, the carrier 1100 is advantageous in that these features allow for a change in the number of articles 300 per extraction cycle without pushing these articles 300 back against the flow of articles 300 in the magazine 202.

Figure 18A:
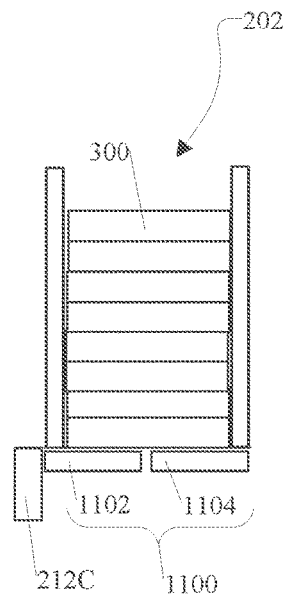
FIG. 18A is a side view of a carrier with two support members at a first position according to an alternative example embodiment of this disclosure.

As an illustrative example, FIG. 18A is a side view of the carrier 1100 in which the first support member 1102 and the second support member 1104 are in the first position. In this first position, the first support member 1102 and the second support member 1104 are configured to support a lowermost article 300, which is disposed within the magazine 202. In this regard, when the first support member 1102 and the second support member 1104 are in the first position, the carrier 1100 does not enable an article 300 to exit from a bottom of the magazine 202.

Figure 18B:
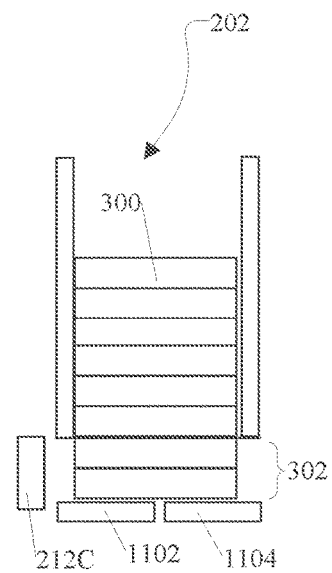
FIG. 18B is a side view of a carrier with two support members at a second position according to the alternative example embodiment of FIG. 18A this disclosure.

FIG. 18B, on the other hand, is a side view of the carrier 1100 in which the first support member 1102 and the second support member 1104 are in a second position. In this second position, the carrier 1100 is configured to support a number of articles 300, which have exited the magazine 202. In this case, the first support member 1102 and the second support member 1104 moved downward from the first position to the second position to support the first set 302 of articles 300. Alternatively, the second position can be set to accommodate a different number or set of articles 300 from the magazine 202. In this regard, for example, the setting of the first position and the second position can be achieved by inputting different parameters into the software and/or hardware controller of the carrier 1100.

Figure 18C:
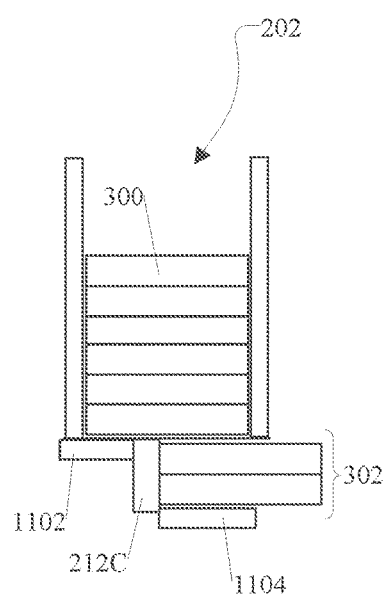
FIG. 18C is a side view of a carrier with a first support member at the first position and a second support member at the second position according to the alternative example embodiment of FIG. 18A this disclosure.

FIG. 18C is a side view of the carrier 1100 when the first support member 1102 is in a position that is different than that of the second support member 1104. That is, the first support member 1102 is configured to move independently from that of the second support member 1104. For instance, as shown in FIG. 18C, the first support member 1102 is in the first position and the second support member 1104 is in the second position. More specifically, in an example scenario, the first support member 1102 is configured to transition from the second position, as shown in FIG. 18B, to the first position, as shown in FIG. 18C. Meanwhile, the second support member 1104 does not have to move with the first support member 1102, but can maintain its support of the first set 302 of articles 300 by remaining in the second position. This positioning of the first support member 1102 and the second support member 1104 is advantageous, for example, when the number of articles 300 to be extracted transitions from a greater number of articles 300 (e.g., two articles) to no articles 300 (e.g., number of articles is zero). In addition, since the first and second support members 1102 and 1104 are configured to move independently from each other, the carrier 1100 is able to prevent at least one article 300 from being pushed back into the magazine 202.

Figure 18D:
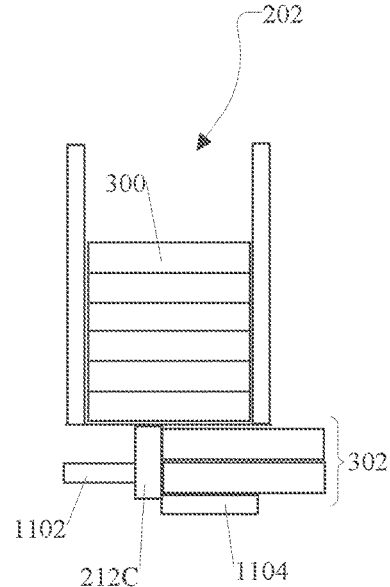
FIG. 18D is a side view of a carrier with a first support member at an intermediate position and a second support member at the second position according to the alternative example embodiment of FIG. 18A this disclosure.

FIG. 18D is a side view of the carrier 1100 when the first support member 1102 is in a position that is different than that of the second support member 1104. That is, the first support member 1102 is configured to move independently from that of the second support member 1104. For instance, as shown in FIG. 18D, the first support member 1102 is at an intermediate position, which is between the first position and the second position. Meanwhile, as shown in FIG. 18D, the second support member 1104 is in the second position. More specifically, in an example scenario, the first support member 1102 is configured to transition from the second position, as shown in FIG. 18B, to the intermediate position, as shown in FIG. 18D. Meanwhile, the second support member 1104 does not have to move with the first support member 1102, but can maintain its support of the first set 302 of articles 300 by remaining in the second position. This positioning of the first support member 1102 and the second support member 1104 is advantageous, for example, when the number of articles 300 to be extracted transitions from a greater number of articles 300 (e.g., two articles 300) to a lesser number of articles 300 (e.g., one article 300). In addition, since the first and second support members 1102 and 1104 are configured to move independently from each other, the carrier 1100 is able to prevent at least one article 300 from being pushed back into the magazine 202.

As described above, the magazine extraction system 200 has a number of advantageous features. For example, the magazine extraction system 200 is configured to accommodate articles 300 of various thicknesses or various amounts via the carrier 206 (or carrier 1100) without having to switch, exchange, or replace machine parts of the magazine extraction system 200. In this regard, the apparatus 100 does not need to be halted in order to switch to different machine parts to accommodate articles 300 of different amounts and/or thicknesses. This feature is advantageous in enabling fast and easy changeovers of articles 300 of different amounts and/or of different thicknesses.

As another example, the magazine extraction system 200 is configured to provide an extractor 212, which is advantageously configured to operate at various velocities, which includes at least a first velocity v1 and a second velocity v2. In this regard, for example, when the extractor 212 operates at the first velocity v1, the extractor 212 is configured to extract at least one article 300 from the magazine with little to no impact. On the other hand, when operating at the second velocity v2, the extractor 212 is able to move the article 300 or articles 300 at a faster velocity than that of the first velocity v1, thereby ensuring an effective throughput of articles 300. In addition, by operating the extractor 212 at the second velocity v2, the extractor 212 is configured to minimize the relative speed difference between itself and the catch element 210, thereby dampening the impact on the article 300 or articles 300.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A magazine extraction system to extract at least one article from a magazine and provide the at least one article to a platform, the magazine extraction system comprising:
   a carrier movable between the magazine and the platform;
   an extractor configured to (a) transition from a first velocity to a second velocity while handling and moving the at least one article along a surface of the carrier and (b) transition from the second velocity to the first velocity before transitioning from the first velocity to the second velocity; and
   a catch element configured to begin moving the at least one article away from the magazine after the extractor has transitioned to the second velocity and after the extractor has moved the at least one article off of the surface of the carrier,
   wherein:
      the first velocity is less than a velocity of the catch element, and
      the second velocity is greater than the first velocity.

2. The magazine extraction system of claim 1, wherein:
   the extractor is connected to a drive train and configured to transition between the first velocity and the second velocity.

3. The magazine extraction system of claim 1, wherein the extractor is positioned above the catch element.

4. The magazine extraction system of claim 1, further comprising:
   a controller configured to control a velocity profile of the extractor so that the extractor is configured to operate at the first velocity and the second velocity at different times.

5. The magazine extraction system of claim 4, wherein:
   the extractor includes a pusher that is configured to push the at least one article; and
   the controller is a steering cam, the steering cam including a steering profile with a first portion and a second portion, the first portion of the steering profile is configured to cause a pusher of the extractor to move at the first velocity and the second portion of the steering profile is configured to cause the pusher to move at the second velocity.

6. The magazine extraction system of claim 1, wherein: the second velocity is equal to the velocity of the catch element for a predetermined period of time.

7. An apparatus comprising:
   a magazine to hold a plurality of articles in an array; and
   a magazine extraction system to extract at least one article from the magazine, the magazine extraction system including:
      a carrier movable between the magazine and a platform;
      an extractor connected to a drive train and configured to transition between a first velocity and a second velocity, the extractor being configured to transition from the first velocity to the second velocity while handling and moving the at least one article along a surface of the carrier;
      a catch element configured to begin moving the at least one article away from the magazine after the extractor has transitioned to the second velocity and after the extractor has moved the at least one article off of the surface of the carrier,
      wherein:
         the first velocity is less than a velocity of the catch element,
         the second velocity is greater than the first velocity.

8. The apparatus of claim 7, wherein the extractor is configured to transition from the second velocity to the first velocity before transitioning from the first velocity to the second velocity.

9. The apparatus of claim 7, wherein the extractor is positioned above the catch element.

10. The apparatus of claim 7, further comprising:
    a controller configured to control a velocity profile of the extractor so that the extractor is configured to operate at the first velocity and the second velocity at different times.

11. The apparatus of claim 10, wherein:
    the extractor includes a pusher that is configured to push the at least one article; and
    the controller is a steering cam, the steering cam including a steering profile with a first portion and a second portion, the first portion of the steering profile is configured to cause a pusher of the extractor to move at the first velocity and the second portion of the steering profile is configured to cause the pusher to move at the second velocity.

12. The apparatus of claim 7, wherein the second velocity is equal to the velocity of the catch element for a predetermined period of time.

13. A method of extracting articles from a magazine, the method comprising:
    providing a carrier that is movable between the magazine and a platform;
    transitioning, via an extractor, from a first velocity to a second velocity while handling and moving at least one article along a surface of the carrier; and
    moving, via a catch element, at least one article away from the magazine and along the platform;
    wherein:
       the first velocity is less than a velocity of the catch element,
       the second velocity is greater than the first velocity,
       the catch element begins moving the at least one article away from the magazine after the extractor has transitioned to the second velocity and after the extractor has moved the at least one article off of the surface of the carrier, and
       the extractor is configured to transition from the second velocity to the first velocity before transitioning from the first velocity to the second velocity.

14. The method of claim 13, further comprising:
    transitioning the extractor between the first velocity and the second velocity in connection with a drive train.

15. The method of claim 13, wherein the extractor is configured to move above the catch element.

16. The method of claim 13, further comprising:
    controlling, via a controller, a velocity profile of the extractor so that the extractor is configured to move at the first velocity and the second velocity at different times.

17. The method of claim 13, wherein:
    the extractor includes a pusher that is configured to push the at least one article; and
    the controller is a steering cam, the steering cam including a steering profile with a first portion and a second portion, the first portion of the steering profile is configured to cause a pusher of the extractor to move at the first velocity and the second portion of the steering profile is configured to cause the pusher to move at the second velocity.

* * * * *